United States Patent
Dobashi et al.

(10) Patent No.: US 8,674,016 B2
(45) Date of Patent: Mar. 18, 2014

(54) PROCESS FOR PRODUCING ORGANIC FIBER-CONTAINING POLYOLEFIN RESIN COMPOSITION

(75) Inventors: Tetsuro Dobashi, Ichihara (JP); Kenji Atarashi, Kimitsu (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 555 days.

(21) Appl. No.: 12/549,819

(22) Filed: Aug. 28, 2009

(65) Prior Publication Data

US 2010/0056699 A1 Mar. 4, 2010

(30) Foreign Application Priority Data

Sep. 2, 2008 (JP) ................................ 2008-224471

(51) Int. Cl.
  *C08L 23/00* (2006.01)
  *C08K 7/02* (2006.01)

(52) U.S. Cl.
  USPC ............................ 524/528; 523/222; 428/327

(58) Field of Classification Search
  USPC .......... 524/430, 437, 444, 528, 543; 523/222; 428/327, 331, 404, 406; 526/170, 351
  See application file for complete search history.

(56) References Cited

U.S. PATENT DOCUMENTS

| | | | |
|---|---|---|---|
| 4,455,344 A * | 6/1984 | Matsuyama et al. | 428/327 |
| 4,670,508 A * | 6/1987 | Ohdaira et al. | 525/64 |
| 4,820,775 A | 4/1989 | Shiga et al. | |
| 5,314,946 A * | 5/1994 | Tajima et al. | 524/513 |
| 2002/0161131 A1 | 10/2002 | Kitano et al. | |

FOREIGN PATENT DOCUMENTS

| | | |
|---|---|---|
| JP | 61-287917 A | 12/1986 |
| JP | 4-323207 A | 11/1992 |
| JP | 08-011131 A | 1/1996 |
| JP | 2002-308947 A | 10/2002 |
| JP | 2004-217753 A | 8/2004 |
| JP | 2004-217754 A | 8/2004 |
| JP | 2004-292581 A | 10/2004 |
| JP | 2006-096836 A | 4/2006 |
| JP | 2007-084713 A | 4/2007 |

OTHER PUBLICATIONS

"JIS Z 8801-1: Test Sieves—Part 1: Test Sieves of metal wire cloth." JIS Japanese Industrial Standard, 2006.*
"Conversion Charts-Mesh-Microns-Inches-Mililmeters Conversions." TEMPO: Precision Molded Foam, [Retrieved online Dec. 21, 2011].*

* cited by examiner

*Primary Examiner* — Hannah Pak
(74) *Attorney, Agent, or Firm* — Panitch Schwarze Belisario & Nadel LLP

(57) ABSTRACT

A production process of an organic fiber-containing polyolefin resin composition includes the step of mixing in a rotary impeller-carrying mixer (1) more than 10 parts by weight to less than 90 parts by weight of an organic fiber, with (2) more than 10 parts by weight to less than 90 parts by weight of a polyolefin resin containing (a) 50 to 100% by weight of polyolefin resin powders passing through a sieve having 2 mm openings, and (b) 0 to 50% by weight of polyolefin resin pellets not passing through a sieve having 2 mm openings and passing through a sieve having 4.75 mm openings.

4 Claims, No Drawings

PROCESS FOR PRODUCING ORGANIC FIBER-CONTAINING POLYOLEFIN RESIN COMPOSITION

FIELD OF THE INVENTION

The present invention relates to a process for producing an organic fiber-containing polyolefin resin composition. In more detail, the present invention relates to a process for producing an organic fiber-containing polyolefin resin composition, in which an organic fiber and a polyolefin resin are homogeneously blended with each other, while the organic fiber is easy to be entangled, and is difficult to be detangled.

BACKGROUND OF THE INVENTION

Since a long time ago, glass fiber-containing resin compositions have been known in the art, in which polyolefin resins are improved in their mechanical strength. In these years, organic fiber-containing polyolefin resin compositions have attracted attention from a viewpoint of a problem of industrial waste products. Particularly, from a viewpoint of a problem of global warming due to carbon dioxide, there have also been investigated polyolefin resin compositions reinforced by carbon-neutral and plant-originated organic fibers. However, organic fibers are easily entangled, and are very difficult to be detangled. Therefore, investigations have been made to blend organic fibers homogeneously with polyolefin resins.

For example, JP8-11131A discloses a composition containing two or more kinds of organic fibers blended homogeneously with a thermoplastic resin powder, which composition is a starting material for producing a fiber-reinforced thermoplastic resin. JP2006-96836A discloses organic fiber-containing pellets produced according to a method of (i) drawing organic fibers to align them, (ii) solidifying them with a binder resin, and then (iii) pelletizing them, which pellets are not so bulky as organic fibers, and therefore can easily be used to make composite compounds. JP2007-84713A discloses a process for producing a cellulose fiber-containing thermoplastic resin composition, comprising the steps of (i) putting aggregative cellulose fibers in a rotary impeller-carrying mixer, (ii) rotating the mixer at a high speed, thereby detangling the cellulose fibers, (iii) putting a thermoplastic resin in the mixer, (iv) agitating the thermoplastic resin to melt it by friction heat, the molten resin adhering to the detangled fibers, thereby forming a mixture containing the fibers and the resin, and (v) agitating the mixture at a low speed under cooling it.

SUMMARY OF THE INVENTION

However, inventions of the above patent applications have restrictions that (i) two or more kinds of fibers are needed, (ii) a solidifying step of fibers with a binder resin is needed, or (iii) two steps are needed (one step of detangling fibers, and another step of mixing the fibers with a resin). Further, those inventions do not have a sufficient effect, from a viewpoint of mixing a resin homogeneously with an organic fiber, while the organic fiber is easy to be entangled, and is difficult to be detangled. Still further, production processes comprising many steps are not preferable from a "carbon-neutral" point of view, because those processes require more energy for production, the "carbon-neutral" viewpoint being one of main reasons for using plant-originated organic fibers.

In view of the above circumstances, the present invention has an object to provide a process for producing an organic fiber-containing polyolefin resin composition, in which an organic fiber and a polyolefin resin are homogeneously blended with each other, while the organic fiber is easy to be entangled, and is difficult to be detangled.

The present invention is a process for producing an organic fiber-containing polyolefin resin composition, comprising the step of mixing in a rotary impeller-carrying mixer:

(1) more than 10 parts by weight to less than 90 parts by weight of an organic fiber; with (2) more than 10 parts by weight to less than 90 parts by weight of a polyolefin resin containing (2-1) 50 to 100% by weight of polyolefin resin powders passing through a sieve having 2 mm openings prescribed in JIS Z8801-1, and (2-2) 0 to 50% by weight of polyolefin resin pellets not passing through a sieve having 2 mm openings prescribed therein and passing through a sieve having 4.75 mm openings prescribed therein; the total of the organic fiber and the polyolefin resin being 100 parts by weight, the total of the polyolefin resin powders and the polyolefin resin pellets being 100% by weight.

The above "JIS" means Japanese Industrial Standards.

DETAILED DESCRIPTION OF THE INVENTION

Preferable examples of the organic fiber in the present invention are synthetic fibers such as polyester fibers, nylon fibers and aromatic polyamide fibers; and plant fibers such as kenaf fibers, ramie fibers, sugarcane fibers, bamboo fibers and hemp fibers.

The organic fiber may be coated with binders. Examples of the binders are polyolefin resins, polyurethane resins, polyester resins, acrylic resins, epoxy resins, starch, and plant oil. Those binders may be combined with acid-modified polyolefin resins or lubricants (for example, paraffin wax), and may also be combined with surface treatment agents in order to improve compatibility and adhesiveness between the organic fibers and polyolefin resins. Examples of the surface treatment agents are silane coupling agents, titanate coupling agents, aluminum coupling agents, chromium coupling agents, zirconium coupling agents, and borane coupling agents. Among them, preferred are silane coupling agents or titanate coupling agents, and more preferred are silane coupling agents.

Examples of the above silane coupling agents are triethoxysilane, vinyltris(β-methoxyethoxy)silane, γ-methacryloxypropyltrimethoxysilane, γ-glycidoxypropyltrimethoxysilane, β-(3,4-epoxycyclohexyl)ethyltrimethoxysilane, N-β-(aminoethyl)-γ-aminopropyltrimethoxysilane, N-β-(aminoethyl)-γ-aminopropylmethyldimethoxysilane, γ-aminopropyltriethoxysilane, N-phenyl-γ-aminopropyltrimethoxysilane, γ-mercaptopropyltrimethoxysilane, and γ-chloropropyltrimethoxysilane. Among them, preferred are aminosilanes such as γ-aminopropyltriethoxysilane and N-β-(aminoethyl)-γ-aminopropyltrimethoxysilane.

The organic fiber can be coated with binders according to a method known in the art, such as an aqueous solution method, an organic solvent method, and a spray method.

Examples of the polyolefin resin in the present invention are polypropylene resins, polyethylene resins, resins of α-olefins having four or more carbon atoms as a main monomer, and modified polyolefin resins modified by unsaturated carboxylic acids or their derivatives, and combinations of two or more of those resins. Among them, preferred are polypropylene resins.

Examples of the above polypropylene resins are propylene homopolymers, propylene-ethylene random copolymers, propylene-α-olefin random copolymers, propylene-ethylene-α-olefin random copolymers, and propylene block copolymers produced according to a process comprising the steps of (i) homopolymerizing propylene, thereby producing propylene homopolymers, and then (ii) copolymerizing ethylene with propylene in the presence of the above propylene homopolymers.

Examples of the above polyethylene resins are ethylene homopolymers, ethylene-propylene random copolymers and ethylene-α-olefin random copolymers.

Examples of the above resins of α-olefins having four or more carbon atoms as a main monomer are α-olefin-propylene random copolymers and α-olefin-ethylene random copolymers.

Examples of the above α-olefins having four or more carbon atoms are 1-butene, 2-methyl-1-propene, 2-methyl-1-butene, 3-methyl-1-butene, 1-hexene, 2-ethyl-1-butene, 2,3-dimethyl-1-butene, 2-methyl-1-pentene, 3-methyl-1-pentene, 4-methyl-1-pentene, 3,3-dimethyl-1-butene, 1-heptene, 5-methyl-1-hexene, 3,4-dimethyl-1-pentene, 3-ethyl-1-pentene, 2,3,3-trimethyl-1-butene, 3-methyl-3-ethyl-1-butene, 1-octene, 4-methyl-1-pentene, 5-ethyl-1-hexene, 4,4-dimethyl-1-hexene, 6-propyl-1-heptene, 6,6-methylethyl-1-heptene, 3,4,4-trimethyl-1-pentene, 4-propyl-1-pentene, 3,3-diethyl-1-butene, 1-nonene, 1-decene, 1-undecene, and 1-dodecene. Among them, preferred is 1-butene, 1-pentene, 1-hexene or 1-octene.

Examples of the above modified polyolefin resins are the following modified polyolefin resins (1) to (4), and combinations of two or more thereof:

(1) modified polyolefin resins obtained by graft polymerizing unsaturated carboxylic acids or their derivatives onto olefin homopolymers;

(2) modified polyolefin resins obtained by graft polymerizing unsaturated carboxylic acids or their derivatives onto olefin copolymers containing two or more kinds of olefin polymerization units;

(3) modified polyolefin resins obtained by graft polymerizing unsaturated carboxylic acids or their derivatives onto olefin block copolymers, the olefin block copolymers being produced according to a process comprising the steps of (3-1) homopolymerizing olefins, thereby forming olefin homopolymers, and (3-2) copolymerizing two or more kinds of olefins in the presence of the olefin homopolymers; and (4) modified polyolefin resins obtained by copolymerizing one or more kinds of olefins with unsaturated carboxylic acids or their derivatives.

The above modified polyolefin resins can be produced according to a solution method, a bulk method, a melt-kneading method, or a combined method of two or more thereof, known in the art. Examples of the solution method, the bulk method or the melt-kneading method are those disclosed in documents such as "Jitsuyo Polymer Alloy Designing" authored by Humio Ide, published by Kogyo Chosakai Publishing Co., Ltd. (1996), Prog. Polym. Sci., 24, 81-142 (1999), JP 2002-308947A, JP 2004-292581A, JP 2004-217753A, and JP 2004-217754A.

The above modified polyolefin resins may be commercially-available products, and examples thereof are MODIPER (trade name) manufactured by NOF Corporation, BLEMMER CP (trade name) manufactured by NOF Corporation, BONDFAST (trade name) manufactured by Sumitomo Chemical Co., Ltd., BONDINE (trade name) manufactured by Sumitomo Chemical Co., Ltd., REXPEARL (trade name) manufactured by Japan Polyethylene Corporation, ADMER (trade name) manufactured by Mitsui Chemicals, Inc. MODIC AP (trade name) manufactured by Mitsubishi Chemical Corporation, Polybond (trade name) manufactured by Chemtura Japan Limited., and Yumex (trade name) manufactured by Sanyo Chemical Industries, Ltd.

Examples of the above unsaturated carboxylic acids are maleic acid, fumaric acid, itaconic acid, acrylic acid and methacrylic acid.

Examples of the above unsaturated carboxylic acid derivatives are acid anhydrides of the above unsaturated carboxylic acids, esters thereof, amides thereof, imides thereof, and metal salts thereof. Specific examples thereof are maleic anhydride, itaconic anhydride, methyl acrylate, ethyl acrylate, butyl acrylate, glycidyl acrylate, methyl methacrylate, ethyl methacrylate, butyl methacrylate, glycidyl methacrylate, 2-hydroxyethyl methacrylate, monoethyl maleate, diethyl maleate, monomethyl fumarate, dimethyl fumarate, acrylamide, methacrylamide, monoamides of maleic acid, diamides of maleic acid, monoamides of fumaric acid, maleimide, N-butylmaleimide, and sodium methacrylate.

The above unsaturated carboxylic acids or their derivatives can be replaced with compounds converting into unsaturated carboxylic acids during the above graft polymerization, such as citric acid and malic acid.

The above unsaturated carboxylic acids or their derivatives are preferably acrylic acid, glycidyl methacrylate, maleic anhydride, or 2-hydroxyethyl methacrylate.

Examples of a polymerization method for producing the polyolefin resins are a solution polymerization method, a slurry polymerization method, a bulk polymerization method, and a gas phase polymerization method, and combined methods of two or more thereof.

Production of the polyolefin resins are disclosed in documents such as "Shin Polymer Seizo Process" authored by Yasuharu Saeki, published by Kogyo Chosakai Publishing Co., Ltd. (1994), JP 4-323207A, and JP 61-287917A.

The polyolefin resins are produced using polymerization catalysts such as multi-site catalysts and single-site catalysts. The multi-site catalysts are preferably catalysts obtained by using solid catalyst components containing titanium atoms, magnesium atoms and halogen atoms. The single-site catalysts are preferably metallocene catalysts.

Polypropylene resins as the polyolefin resins are produced preferably using the above catalysts obtained by using solid catalyst components containing titanium atoms, magnesium atoms and halogen atoms.

In the present invention, the polyolefin resin is used in an amount of more than 10 parts by weight to less than 90 parts by weight, and the organic fiber is used in an amount of more than 10 parts by weight to less than 90 parts by weight. From a viewpoint of overall quality (for example, performance of the resin compositions obtained, and its fluctuating range), and in order to detangle the organic fiber, the polyolefin resin is used in an amount of preferably more than 20 parts by weight to less than 90 parts by weight, and further preferably more than 30 parts by weight to less than 90 parts by weight, and the organic fiber is used in an amount of preferably more than 10 parts by weight to less than 80 parts by weight, and further preferably more than 10 parts by weight to less than 70 parts by weight, the total of the polyolefin resin and the organic fiber being 100 parts by weight.

The polyolefin resin contains a mixture of the polyolefin resin powders with the polyolefin resin pellets, or only the polyolefin resin powders. The mixture contains 50 to 100% by weight, and preferably 60 to 100% by weight of the polyolefin resin powders, and 0 to 50% by weight, and preferably 0 to 40% by weight of the polyolefin resin pellets, the total of the polyolefin resin powders and the polyolefin resin pellets being 100% by weight.

The polyolefin resin powders can be produced using the above catalysts according to the above polymerization method. All the so-produced polyolefin resin powders are usually 1 to 2 mm in their diameter.

The polyolefin resin pellets having a desired size can be obtained by cutting melt-kneaded products of the above polyolefin resin powders optionally containing additives (for example, antioxidants), according to a method such as a strand cutting method and an under water cutting method.

The rotary impeller-carrying mixer in the present invention is, for example, a Henschel mixer. The organic fiber and the polyolefin resin are not limited in their feeding order to the mixer. Also, the rotary impeller end is not particularly limited in its circumferential velocity. Further, the organic fiber and the polyolefin resin are not particularly limited in their mixing time. The circumferential velocity and the mixing time may be suitably regulated according to a mixing state. The mixing time is preferably 1 to 5 minutes from a viewpoint of production efficiency. Therefore, the above circumferential velocity may be regulated so that the organic fiber and the polyolefin resin are homogeneously mixed within such a mixing time. When the circumferential velocity is so high that their homogeneous mixing is completed within one minute, the organic fiber is possibly ruptured. The term "homogeneous mixture" in the present invention means a mixture whose 70% by weight or more passes through a sieve having 4.75 mm openings prescribed in JIS Z8801-1.

The organic fiber or the polyolefin resin may be combined with neutralizing agents such as calcium stearate; phenol antioxidants (for example, IRGANOX 1010 manufactured by Ciba Specialty Chemicals K.K.); phosphor antioxidants (for example, IRGAFOS 168 manufactured by Ciba Specialty Chemicals K.K.); nucleating agents; or talc.

The resin compositions produced according to the production process of the present invention may be mixed with rubbers or other polyolefin resins than the polyolefin resin in the present invention. Examples of plasticizing apparatuses used for such mixing are a Banbury mixer, a single screw extruder, a co-rotating twin screw extruder (for example, TEM (trade name) manufactured by Toshiba Machine Co., Ltd., and TEX (trade name) manufactured by The Japan Steel Works, Ltd.), and a counter-rotating twin screw extruder (for example, FCM (trade name) manufactured by Kobe Steel, Ltd., and CMP (trade name) manufactured by The Japan Steel Works, Ltd.).

While organic fibers are easy to be entangled, and are difficult to be detangled, the present invention can detangle organic fibers by a simple method. Therefore, the present invention can produce resin compositions containing a homogeneous mixture of organic fibers with polyolefin resins.

EXAMPLE

The present invention is explained in more detail with reference to the following Examples, which do not limit the present invention.

Example 1

There were mixed 210 g (70 parts by weight) of Kenaf bast fiber (organic fiber) having 3 mm fiber-length, manufactured by UNIPACS CO., LTD., and 90 g (30 parts by weight) of propylene homopolymer powders (polyolefin resin powders) passing through a sieve having 2 mm openings prescribed in JIS Z8801-1, manufactured by Sumitomo Chemical Co., Ltd., and a melt flow rate (MFR) of 20 g/10 minutes, with each other, by use of SUPERMIXER ST-J-20 having a 20 liter volume and four rotary impellers, manufactured by KAWATA MFG. CO., LTD., at a rotation speed of 550 rpm, and at a circumferential velocity of its impeller end of 8.6 m/second, for three minutes, thereby obtaining a mixture (organic fiber-containing polyolefin resin composition).

The total of the obtained mixture was put gently onto a sieve having 4.75 mm openings prescribed in JIS Z8801-1. The sieve was shaken vigorously for 20 seconds by hand. The amount of the mixture passing through the sieve was found to be 222 g (passage rate=222×100/(210+90)=74% by weight). Results are shown in Table 1.

Example 2

Example 1 was repeated except that (i) the amount of the polyolefin resin powders was changed to 45 g (15 parts by weight), and (ii) 45 g (15 parts by weight) of propylene homopolymer pellets (polyolefin resin pellets) was further used, the propylene homopolymer pellets having a trade name of NOBLENE Z101A manufactured by Sumitomo Chemical Co., Ltd., and a melt flow rate (MFR) of 20 g/10 minutes, and not passing through a sieve having 2 mm openings prescribed in JIS Z8801-1, and passing through a sieve having 4.75 mm openings prescribed therein, thereby obtaining a mixture (organic fiber-containing polyolefin resin composition).

The amount of the mixture passing through the sieve was found to be 228 g (passage rate=76% by weight). Results are shown in Table 1.

Comparative Example 1

Example 1 was repeated except that (i) the amount of the organic fiber was changed to 300 g (100 parts by weight), and (ii) the polyolefin resin powders were not used, thereby obtaining the treated fibers.

The amount of the treated fibers passing through the sieve was found to be 81 g (passage rate=27% by weight). Results are shown in Table 1.

Comparative Example 2

Example 1 was repeated except that (i) the amount of the organic fiber was changed to 300 g (100 parts by weight), (ii) the polyolefin resin powders were not used, and (iii) a mixing tool was changed from SUPERMIXER ST-J-20 to a 5-liter volume plastic bag, in which the organic fiber was shaken vigorously by hand for one minutes, thereby obtaining the treated fibers.

The amount of the treated fibers passing through the sieve was found to be 33 g (passage rate=11% by weight). Results are shown in Table 1.

Comparative Example 3

Example 1 was repeated except that (i) the amount of the organic fiber was changed to 270 g (90 parts by weight), (ii) the polyolefin resin powders were not used, and (iii) 30 g (10 parts by weight) of the propylene homopolymer pellets in Example 2 was further used, thereby obtaining a mixture.

The amount of the mixture passing through the sieve was found to be 157 g (passage rate=52% by weight). Results are shown in Table 1.

Comparative Example 4

Example 1 was repeated except that (i) the amount of the organic fiber was changed to 270 g (90 parts by weight), (ii)

the polyolefin resin powders were not used, (iii) 30 g (10 parts by weight) of the propylene homopolymer pellets in Example 2 was further used, and (iii) a mixing tool was changed from SUPERMIXER ST-J-20 to a 5-liter volume plastic bag, thereby obtaining a mixture.

The amount of the mixture passing through the sieve was found to be 173 g (passage rate=58% by weight). Results are shown in Table 1.

Comparative Example 5

Example 1 was repeated except that (i) the amount of the organic fiber was changed to 270 g (90 parts by weight), and (ii) the amount of the polyolefin resin powders was changed to 30 g, thereby obtaining a mixture.

The amount of the mixture passing through the sieve was found to be 187 g (passage rate=62% by weight). Results are shown in Table 1.

Comparative Example 6

Example 1 was repeated except that (i) the amount of the organic fiber was changed to 270 g (90 parts by weight), (ii) the amount of the polyolefin resin powders was changed to 30 g, and (iii) a mixing tool was changed from SUPERMIXER ST-J-20 to a 5-liter volume plastic bag, thereby obtaining a mixture.

The amount of the mixture passing through the sieve was found to be 134 g (passage rate=45% by weight). Results are shown in Table 1.

Comparative Example 7

Example 1 was repeated except that (i) the polyolefin resin powders were not used, and (ii) 90 g (30 parts by weight) of the propylene homopolymer pellets in Example 2 was further used, thereby obtaining a mixture.

The amount of the mixture passing through the sieve was found to be 198 g (passage rate=66% by weight). Results are shown in Table 1.

Comparative Example 8

Example 1 was repeated except that (i) the polyolefin resin powders were not used, (ii) 90 g (30 parts by weight) of the propylene homopolymer pellets in Example 2 was further used, and (iii) a mixing tool was changed from SUPER-MIXER ST-J-20 to a 5-liter volume plastic bag, thereby obtaining a mixture.

The amount of the mixture passing through the sieve was found to be 204 g (passage rate=68% by weight). Results are shown in Table 1.

Comparative Example 9

Example 1 was repeated except that a mixing tool was changed from SUPERMIXER ST-J-20 to a 5-liter volume plastic bag, thereby obtaining a mixture.

The amount of the mixture passing through the sieve was found to be 181 g (passage rate=60% by weight). Results are shown in Table 1.

Comparative Example 10

Example 1 was repeated except that (i) the amount of the polyolefin resin powders was changed to 45 g (15 parts by weight), (ii) 45 g (15 parts by weight) of the propylene homopolymer pellets in Example 2 was further used, and (iii) a mixing tool was changed from SUPERMIXER ST-J-20 to a 5-liter volume plastic bag, thereby obtaining a mixture.

The amount of the mixture passing through the sieve was found to be 207 g (passage rate=69% by weight). Results are shown in Table 1.

Table 1 shows the followings:

(1) Examples 1 and 2, which satisfy all the requirements of the present invention, give a homogeneous mixture, and are large in their passage rate of the sieve;

(2) Comparative Examples 1 and 2, which use only the organic fiber and use no polyolefin resin, are small in their passage rate of the sieve;

(3) Comparative Examples 3 to 6, which do not satisfy the quantitative requirement of the polyolefin resin or the organic fiber defined in the present invention, are small in their passage rate of the sieve;

(4) Comparative Examples 7 and 8, which use only the polyolefin pellets and use no polyolefin powders, are small in their passage rate of the sieve; and (5) Comparative Examples 9 and 10, which use a plastic bag in place of a rotary impeller-carrying mixer defined in the present invention, are small in their passage rate of the sieve.

TABLE 1

|  | Example | | Comparative Example | | | | | | | | | |
| --- | --- | --- | --- | --- | --- | --- | --- | --- | --- | --- | --- | --- |
|  | 1 | 2 | 1 | 2 | 3 | 4 | 5 | 6 | 7 | 8 | 9 | 10 |
| Organic fiber (part by weight) | 70 | 70 | 100 | 100 | 90 | 90 | 90 | 90 | 70 | 70 | 70 | 70 |
| Polyolefin resin: | | | | | | | | | | | | |
| Pellets (part by wt) |  | 15 |  |  | 10 | 10 |  |  | 30 | 30 |  | 15 |
| Powders (part by wt) | 30 | 15 |  |  |  |  | 10 | 10 |  |  | 30 | 15 |
| Mixing tool (Note) | A | A | A | B | A | B | A | B | A | B | B | B |
| Passage rate of sieve (wt %) | 74 | 76 | 27 | 11 | 52 | 58 | 62 | 45 | 66 | 68 | 60 | 69 |

Note:
"A" means a rotary impeller-carrying mixer, and "B" means a plastic bag

The invention claimed is:

1. A process for producing an organic fiber-containing polyolefin resin composition, comprising the step of mixing in a rotary impeller-carrying mixer:
   (1) more than 10 parts by weight to less than 90 parts by weight of an organic fiber; with
   (2) more than 10 parts by weight to less than 90 parts by weight of a polyolefin resin containing a mixture of (a) 50 to less than 100% by weight of polyolefin resin powders passing through a sieve having 2 mm openings prescribed in Japanese Industrial Standards Z8801-1, the polyolefin resin powders being 1 to 2 mm in diameter, and (b) more than 0 to 50% by weight of polyolefin resin pellets not passing through a sieve having 2 mm openings prescribed in Japanese Industrial Standards Z8801-1 and passing through a sieve having 4.75 mm openings prescribed in Japanese Industrial Standards Z8801-1; the total of the organic fiber and the polyolefin resin being 100 parts by weight, the total of the polyolefin resin powders and the polyolefin resin pellets being, 100% by weight.

2. The process for producing an organic fiber-containing polyolefin resin composition according to claim 1, wherein the rotary impeller-carrying mixer is a Henschel mixer.

3. The process for producing an organic fiber-containing polyolefin resin composition according to claim 1, wherein more than 10 parts by weight to less than 70 parts by weight of the organic fiber and more than 30 parts by weight to less than 90 parts by weight of the polyolefin resin are mixed with each other, the total of the organic fiber and the polyolefin resin being 100 parts by weight.

4. The process for producing an organic fiber-containing polyolefin resin composition according to claim 1, wherein the polyolefin resin contains a mixture of 60 to less than 100% by weight of polyolefin resin powders, and more than 0 to 40% by weight of polyolefin resin pellets, the total of the polyolefin resin powders and the polyolefin resin pellets being 100% by weight.

* * * * *